United States Patent
Zintler

Patent Number: 5,799,516
Date of Patent: Sep. 1, 1998

[54] APPARATUS FOR UNLOCKING DOORS OF A MOTOR VEHICLE

[75] Inventor: Albert Zintler, Gross-Gerau, Germany

[73] Assignee: VDO Adolf Schindling AG, Frankfurt, Germany

[21] Appl. No.: 757,098

[22] Filed: Dec. 2, 1996

[30] Foreign Application Priority Data

Dec. 23, 1995 [DE] Germany ............... 195 48 562.9

[51] Int. Cl.$^6$ ........................................... E05B 63/14
[52] U.S. Cl. ........................... 70/92; 70/255; 70/264; 70/465; 180/286; 280/748; 292/DIG. 22; 292/DIG. 65; 297/480
[58] Field of Search ............... 70/256, 257, 92, 70/255, 465, 258, 261, 264; 292/DIG. 22, DIG. 65; 180/274, 286; 280/748, 806; 297/480

[56] References Cited

U.S. PATENT DOCUMENTS

| | | | |
|---|---|---|---|
| 3,757,064 | 9/1973 | Ogawa | 292/201 X |
| 3,799,596 | 3/1974 | Nozomu et al. | 292/DIG. 22 X |
| 3,990,531 | 11/1976 | Register | 292/DIG. 22 X |
| 4,422,522 | 12/1983 | Slavin et al. | 292/DIG. 22 X |
| 4,536,021 | 8/1985 | Mochida | 292/DIG. 22 X |
| 5,497,641 | 3/1996 | Linde et al. | 70/257 |
| 5,655,619 | 8/1997 | Suran et al. | 180/286 X |

FOREIGN PATENT DOCUMENTS

| | | | |
|---|---|---|---|
| 2228384 | 11/1974 | France | 292/DIG. 22 |
| 2908613 | 9/1980 | Germany | 70/256 |
| 2946095 | 5/1981 | Germany | 292/DIG. 22 |
| 157381 | 6/1990 | Japan | 70/264 |
| 609286 | 2/1979 | Switzerland | 180/286 |

OTHER PUBLICATIONS

Bosch handbook "Kraftfahr Technischem Taschenbuch" (19th Edition) Robert Bosch GmbH 1984, (see, in particular enclosed translation & pp. 616 and 539).

*Primary Examiner*—Lloyd A. Gall
*Attorney, Agent, or Firm*—Martin A. Farber

[57] ABSTRACT

In an apparatus for the unlocking of doors of a motor vehicle in the event of an accident, at least one device for tensioning a safety belt is, in the case of an accident, operatively connected with at least one door-unlocking device. Operation of the belt tensioning device during an accident initiates operation of the door unlocking mechanism.

12 Claims, 2 Drawing Sheets

APPARATUS FOR UNLOCKING DOORS OF A MOTOR VEHICLE

FIELD AND BACKGROUND OF THE INVENTION

The present invention relates to an apparatus for unlocking doors of a motor vehicle in the event of an accident.

In particular in vehicles having central locks, people are increasingly driving with the doors locked in order to prevent undesirable persons from entering the vehicle. This, to be sure, has the disadvantage that in the event of an accident the passengers who are possibly unconscious or in shock are locked therein. Thus, valuable time quickly passes until helpers can open the doors from the outside by means of a suitable tool.

SUMMARY OF THE INVENTION

It is an object of the invention to provide an apparatus for automatically unlocking the doors of a motor vehicle in the event of an accident.

According to the invention, at least one device (4, 25) for tensioning a safety belt in the event of an accident is operatively connected (5, 7, 12, 20) with at least one door-unlocking device.

The apparatus of the invention has the advantage that the doors are unlocked without the use of an additional sensor. The operative connection (5, 12) can be developed mechanically. For the development in detail of the operative mechanical connection there are various possibilities available to the person skilled in the art. Within the scope of the invention, it is preferably provided that the operative connection is formed, at least in part, by a Bowden cable (5) and/or by a lever (11).

These further developments of the invention have the advantage that no additional source or energy is necessary for the device of the invention itself, although, depending on the specific use, a source of energy, for instance a pneumatic pressure accumulator, may be employed.

In another development of the apparatus of the invention, an operative connection (20) is developed electrically and has a current supply (26) which is independent of the electrical system of the car. In this way, even in the event that the battery of the vehicle is torn off in the case of an accident, the provision of current to the device of the invention is assured.

In one advantageous embodiment of the invention it is provided that a device for tensioning a safety belt is connected in each case to an adjacent unlocking device. In this embodiment, an obtaining of an operative connection is possible with simple mechanical means by the arrangement of the device for tensioning a safety belt within a post.

For the unlocking of the door itself it can be provided in the case of the device of the invention that the unlocking device is developed in such a manner that a bolt (9) within the post (3) can be moved into an unlocked position. In this case, the bolt and the closing parts of the lock which are contained in the door are so developed that, upon a movement of the bolt effected by the device in accordance with the invention, the door is unlocked but not, however, opened.

As an alternative, it can be provided in the apparatus of the invention that the unlocking device is developed in the manner that an unlocking device which is already present in the door lock can be actuated from the post (3), with the door closed, via the operative connection (10, 14, 16, 18). For the transmission of the movement from the post to the lock of the door, various parts, for instance levers or push rods, enter into consideration.

In further development of the invention, another door (13) on the same side of the vehicle can be unlocked via the operative connection (10, 14 to 18) by the same device (4) as for the tensioning of a safety belt.

Finally, a further development of the invention is that the door unlocking device (20) is a central locking system which is operatively connected with at least one device (25) for tensioning a safety belt—in the following referred to as belt tensioner. This further development has the advantage that all doors are unlocked even if only one belt tensioner responds. This can, for instance, substantially facilitate rapid access by helpers. In this case, the central locking system (20) preferably has a current supply (26) which is independent of the electrical system of the motor vehicle.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
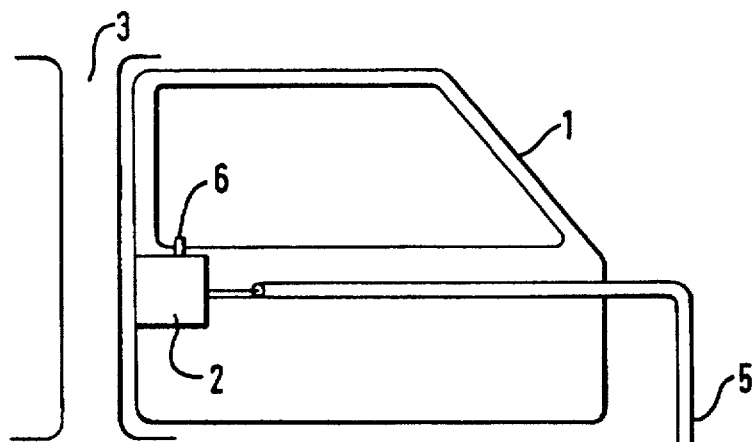
FIG. 1 shows diagrammatically an embodiment of the invention in which a belt tensioner and the lock of a front door are connected by a pneumatically operated Bowden cable.

Identical parts have been provided with the same reference numerals in the figures.

A left front door 1, shown in the figures, has a lock 2. The lock 2 holds the door 1 closed by known closure parts (not shown) which, in closed state, grip around a bolt on the door post 3. A belt tensioner 4, which is ordinarily arranged in the lower region of the post 3 is, for the sake of clarity of the drawing, shown below the post. In the embodiment shown in FIG. 1, the belt tensioner 4 is connected via a Bowden cable 5 with a known locking and unlocking device or mechanism within the lock 2. The lock 2 and thus the door 1 can, as customary, be locked and unlocked by means of pin 6 or a central locking system not shown in FIG. 1. If, however, the belt tensioner 4 is released as the result of an accident, the door 1 will also be unlocked via the Bowden cable 5.

Figure 2:
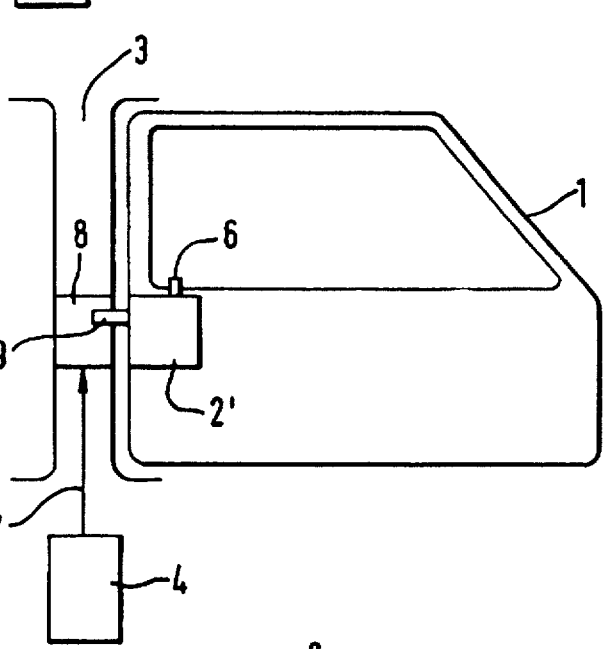
FIG. 2 shows diagrammatically a belt tensioner having an unlocking device in the post.
Figure 3:
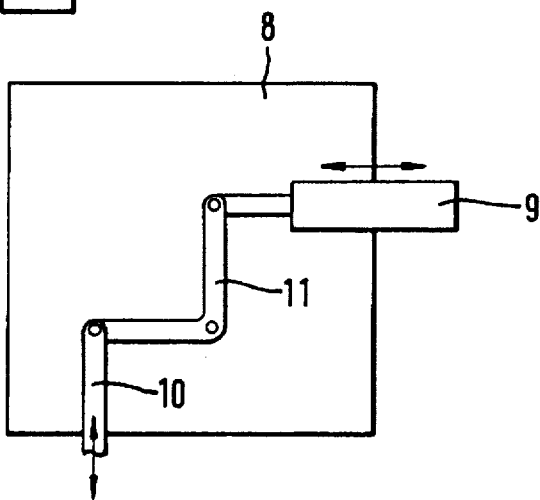
FIG. 3 is a diagrammatic showing of the unlocking device in the case of the embodiment shown in FIG. 2.

In the embodiment shown in FIG. 2, the belt tensioner 4 is connected via an operative connection 7 with an unlocking device 8 arranged in the post 3. In the unlocking device 8, a pin (or bolt) 9 which holds the door 1 closed is movably arranged, as shown in FIG. 3. The corresponding lock 2' is so developed that, in a certain position of the bolt 9, the door is unlocked but not opened. In the diagrammatic example of the unlocking device 8 shown in FIG. 3, the transmission of force between the belt tensioner 4 and the unlocking device 8 takes place via a push rod 10 and a right-angle shift lever 11.

Figure 4:
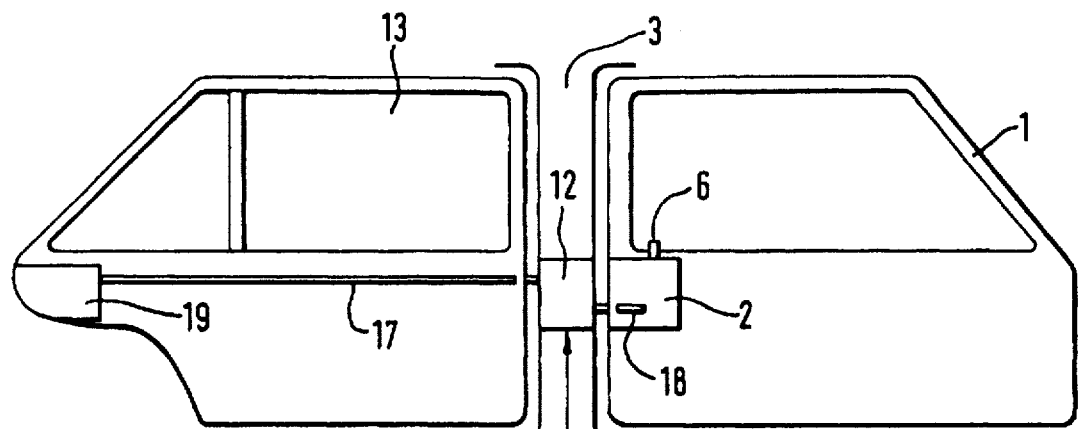
FIG. 4 shows diagrammatically an embodiment with an unlocking of two doors.
Figure 5:
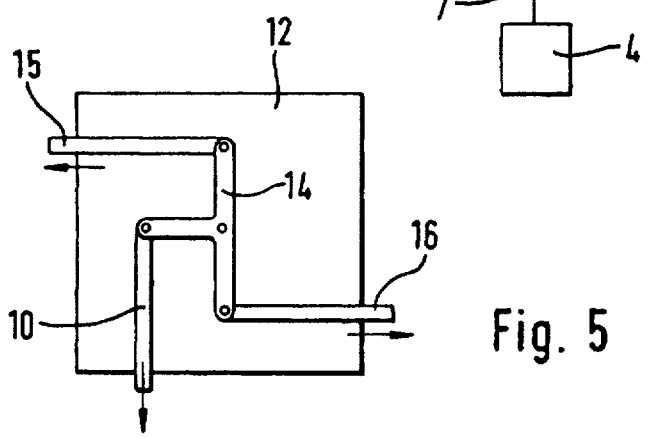
FIG. 5 shows a diagrammatic showing of a part of the operative connection in the case of the embodiment shown in FIG. 4.

In the embodiment shown in FIGS. 4 and 5, both the front door 1 and a rear door 13 are unlocked via a shift device 12 connected to a belt tensioner 4. For this purpose, upon activation of the belt tensioner 4, the push rod 10 is moved briefly in the direction indicated by the arrow. On a three-arm lever 14 there are arranged two push rods 15, 16 which penetrate a short distance into the doors 1, 13 and there unlock the doors via, for instance, additional push rods 17, 18 which are connected with the locks 2, 19.

Figure 6:
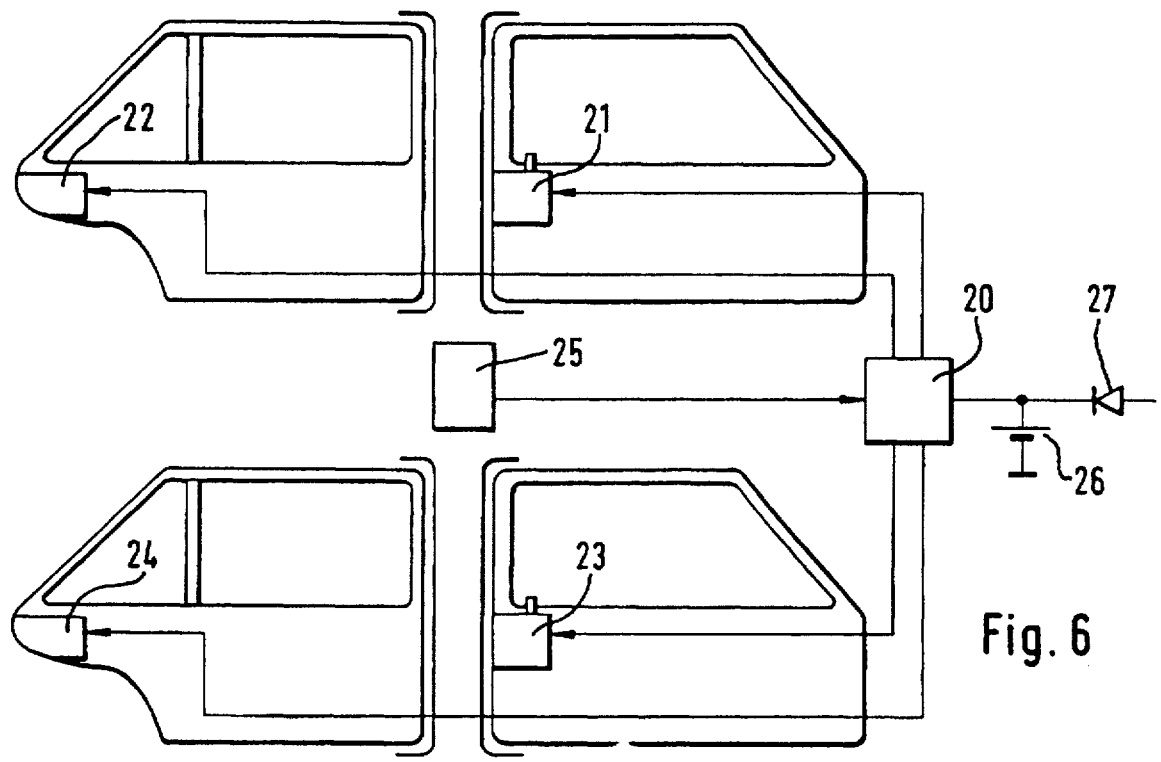
FIG. 6 shows diagrammatically a device in accordance with the invention having a central locking system.

FIG. 6 shows an embodiment having a central locking system which consists of a control unit 20 and electrically or pneumatically lockable and unlockable locks 21 to 24. In the embodiment shown, a signal for controlling the central locking is produced in a belt tensioner 25 upon the release of the belt tensioner and is fed to the control unit 20. The control unit 20 is supplied with voltage by a battery 26 which is connected, via a diode 27, with the car electrical system (not shown). Thereby, the control unit 20 continues to be supplied by the battery 26 upon a collapse of the voltage of the car electrical system.

I claim:

1. In combination with a motor vehicle having a seat-belt tensioning device and a door wherein said door has a lock comprising an unlocking mechanism, an apparatus for activating said unlocking mechanism, comprising:

an operative connection between said unlocking mechanism and said tensioning device for activating said unlocking mechanism in the event of an accident.

2. The combination according to claim 1, wherein the operative connection is mechanical.

3. The combination according to claim 2, wherein the operative connection comprises at least, in part, a Bowden cable.

4. The combination according to claim 2, wherein the operative connection comprises at least in part, a lever.

5. The combination according to claim 1, wherein the operative connection is electrical and has a current supply which is operative independently of an electrical system of the vehicle.

6. The combination according to claim 1, wherein said door unlocking mechanism is part of a central locking system which is operatively connected with at least one of the belt tensioning devices.

7. The combination according to claim 6, wherein the central locking system has current supply which is independent of the electrical system of the motor vehicle.

8. In combination with a motor vehicle having a plurality of seat-belt tensioning devices and a plurality of doors and a plurality of locks located at respective ones of said doors and a plurality of unlocking mechanisms disposed in respective ones of said locks, a system of apparatuses for activating said unlocking mechanisms, comprising:

a plurality of operative connections disposed in respective ones of said apparatuses between respective ones of said unlocking mechanisms and tensioning devices; and wherein said operative connections are responsive to effects on respective ones of said tensioning devices for activating respective ones of said unlocking mechanisms.

9. The combination according to claim 8, wherein each of said door locks comprises a bolt moveable into a door post of the vehicle, the unlocking mechanism in each of said door locks serving to move the bolt into an unlocked position.

10. The combination according to claim 8, further comprising a push-rod means located in a post of said vehicle and interconnecting a plurality of said connections; wherein each of said unlocking mechanisms is present in a respective one of said door locks and is moveable from the post, with the respective door closed, via said push-rod means acting on a respective one of the operative connections.

11. The combination according to claim 10, wherein there are a plurality of doors on one side of the vehicle which can be unlocked via said push-rod means and respective ones of said operative connections in response to operation of one of said belt tensioning devices.

12. The combination according to claim 8, wherein each door unlocking mechanism is part of a central locking system which is operatively connected with at least one of the belt tensioning devices.

* * * * *